(12) United States Patent
Kitano et al.

(10) Patent No.: US 10,870,254 B2
(45) Date of Patent: Dec. 22, 2020

(54) INTERLAYER FILM FOR LAMINATED GLASS AND LAMINATED GLASS

(71) Applicant: Sekisui Chemical Co., Ltd., Osaka (JP)

(72) Inventors: Hirofumi Kitano, Shiga (JP); Hiroaki Inui, Shiga (JP); Taiki Katayama, Osaka (JP); Manabu Matsumoto, Shiga (JP); Kazuhiko Nakayama, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 635 days.

(21) Appl. No.: 14/905,995

(22) PCT Filed: Aug. 1, 2014

(86) PCT No.: PCT/JP2014/070398
§ 371 (c)(1),
(2) Date: Jan. 19, 2016

(87) PCT Pub. No.: WO2015/016361
PCT Pub. Date: Feb. 5, 2015

(65) Prior Publication Data
US 2016/0151995 A1 Jun. 2, 2016

(30) Foreign Application Priority Data

Aug. 1, 2013 (JP) ................. 2013-160502

(51) Int. Cl.
*B32B 3/28* (2006.01)
*B32B 3/30* (2006.01)
(Continued)

(52) U.S. Cl.
CPC .................. *B32B 3/28* (2013.01); *B32B 3/00* (2013.01); *B32B 3/02* (2013.01); *B32B 3/30* (2013.01);
(Continued)

(58) Field of Classification Search
CPC ..... Y10T 428/24355; Y10T 428/24694; B32B 3/28; B32B 3/30; B32B 17/10587;
(Continued)

(56) References Cited

U.S. PATENT DOCUMENTS 5,455,103 A * 10/1995 Hoagland ......... B32B 17/10577
156/102
6,863,956 B1 3/2005 Nakajima et al.
(Continued)

FOREIGN PATENT DOCUMENTS

CN 101300133 11/2008
CN 101668630 3/2010
(Continued)

OTHER PUBLICATIONS

International Preliminary Report on Patentability dated Feb. 4, 2016 in corresponding International Application No. PCT/JP2014/070398.
(Continued)

*Primary Examiner* — Joanna Pleszczynska
(74) *Attorney, Agent, or Firm* — Wenderoth, Lind & Ponack, L.L.P.

(57) ABSTRACT

The present invention is an interlayer film for laminated glass that includes 2 or more resin layers laminated on each other. The interlayer film for laminated glass has a large number of recesses and a large number of protrusions on at least one surface thereof. The recesses each have a groove shape with a continuous bottom. The recesses adjacent to each other are parallel to each other and regularly arranged in a line.

6 Claims, 2 Drawing Sheets

(51) Int. Cl.

| | | |
|---|---|---|
| *B32B 17/10* | (2006.01) | |
| *B32B 27/08* | (2006.01) | |
| *B32B 27/30* | (2006.01) | |
| *B32B 27/22* | (2006.01) | |
| *B32B 7/06* | (2019.01) | |
| *B32B 3/02* | (2006.01) | |
| *B32B 7/02* | (2019.01) | |
| *B32B 27/18* | (2006.01) | |
| *B32B 27/28* | (2006.01) | |
| *B32B 7/10* | (2006.01) | |
| *B32B 27/06* | (2006.01) | |
| *B32B 3/00* | (2006.01) | |
| *B32B 27/00* | (2006.01) | |
| *B32B 7/00* | (2019.01) | |
| *B32B 17/06* | (2006.01) | |

(52) U.S. Cl.
CPC ............... *B32B 7/00* (2013.01); *B32B 7/02* (2013.01); *B32B 7/06* (2013.01); *B32B 7/10* (2013.01); *B32B 17/064* (2013.01); *B32B 17/10587* (2013.01); *B32B 17/10761* (2013.01); *B32B 27/00* (2013.01); *B32B 27/06* (2013.01); *B32B 27/08* (2013.01); *B32B 27/18* (2013.01); *B32B 27/22* (2013.01); *B32B 27/28* (2013.01); *B32B 27/30* (2013.01); *B32B 27/306* (2013.01); *B32B 2250/00* (2013.01); *B32B 2250/03* (2013.01); *B32B 2307/10* (2013.01); *B32B 2307/102* (2013.01); *B32B 2307/40* (2013.01); *B32B 2307/412* (2013.01); *B32B 2307/50* (2013.01); *B32B 2307/514* (2013.01); *B32B 2307/538* (2013.01); *B32B 2307/584* (2013.01); *B32B 2307/724* (2013.01); *B32B 2307/748* (2013.01); *B32B 2419/00* (2013.01); *B32B 2605/00* (2013.01); *B32B 2605/006* (2013.01); *B32B 2605/08* (2013.01); *B32B 2605/18* (2013.01)

(58) Field of Classification Search
CPC ........ B32B 17/10761; B32B 17/10577; B32B 27/08; B32B 27/306
See application file for complete search history.

(56) References Cited

U.S. PATENT DOCUMENTS

| | | | |
|---|---|---|---|
| 7,678,441 B2* | 3/2010 | Smith | ............ B29C 59/022 428/141 |
| 2006/0188695 A1* | 8/2006 | Yacovone | ............ B29D 7/01 428/141 |
| 2006/0210782 A1* | 9/2006 | Lu | ............ B32B 17/10036 428/212 |
| 2009/0246517 A1 | 10/2009 | Hatta | |
| 2013/0202863 A1 | 8/2013 | Shimamoto et al. | |
| 2015/0174862 A1 | 6/2015 | Kitano et al. | |

FOREIGN PATENT DOCUMENTS

| | | |
|---|---|---|
| CN | 103140452 | 6/2013 |
| EP | 2 881 376 | 6/2015 |
| JP | 10-45438 | 2/1998 |
| JP | 10-231150 | 9/1998 |
| JP | 11-35348 | 2/1999 |
| JP | 2000-7390 | 1/2000 |
| JP | 2000-203900 | 7/2000 |
| JP | 2003-286049 | 10/2003 |
| JP | 2004-143008 | 5/2004 |
| JP | 2007-331959 | 12/2007 |
| JP | 2011-88783 | 5/2011 |
| TW | 524784 | 3/2003 |
| WO | 2008/134594 | 11/2008 |
| WO | 2014/021459 | 2/2014 |

OTHER PUBLICATIONS

Extended European Search Report dated Dec. 5, 2016 in corresponding European patent application No. 14832048.4.

* cited by examiner

INTERLAYER FILM FOR LAMINATED GLASS AND LAMINATED GLASS

TECHNICAL FIELD

The present invention relates to an interlayer film for laminated glass that includes 2 or more resin layers laminated on each other, exhibits excellent deaerating properties in the manufacturing process of laminated glass, and can prevent the occurrence of ghost images. The present invention also relates to laminated glass including the interlayer film for laminated glass.

BACKGROUND ART

Laminated glass, which is obtained by sandwiching an interlayer film for laminated glass that contains a thermoplastic resin such as thermoplastic polyvinyl butyral between two sheets of glass plates and bonding the interlayer film to the glass plates, is widely used in window glass for automobiles, airplanes, buildings, and the like.

The interlayer film for laminated glass may be constituted not only of a single resin layer but also of a laminate composed of 2 or more resin layers. If the 2 or more resin layers are composed of a first resin layer and a second resin layer, and the properties of the first resin layer are different from the properties of the second resin layer, an interlayer film for laminated glass can be provided which has various performances that are not easily realized with only a single layer.

For example, PTL 1 discloses an interlayer film for laminated glass that has a 3-layered structure composed of a sound insulating layer and 2 protective layers interposing the sound insulating layer therebetween. The interlayer film for laminated glass of PTL 1 includes the sound insulating layer containing a polyvinyl acetal resin, which has excellent affinity with a plasticizer, and a large amount of a plasticizer, and consequentially, the interlayer film exhibits excellent sound insulating properties. Meanwhile, the protective layers prevent the adhesiveness between the interlayer film and glass from deteriorating due to bleeding out of a large amount of the plasticizer contained in the sound insulating layer.

However, the laminated glass using such an interlayer film for laminated glass that includes 2 or more resin layers laminated on each other has the following problem. That is, when external light rays are visually recognized through the laminated glass, images are seen as ghost images in some cases, or optical strain is recognized in some cases. The occurrence of ghost images or the optical strain is markedly observed particularly in the case of the interlayer film for laminated glass having excellent sound insulating properties that is described in PTL 1.

CITATION LIST

Patent Literature

[PTL 1] JP-A-2007-331959

SUMMARY OF INVENTION

Technical Problem

The present inventors investigated the cause of the occurrence of ghost images in the case of using the interlayer film for laminated glass that includes 2 or more resin layers laminated on each other. As a result, they found that recesses and protrusions formed on a surface of the interlayer film for laminated glass are the cause.

Generally, when manufacturing laminated glass, a laminate, in which an interlayer film for laminated glass is laminated between at least 2 sheets of glass plates, is passed through and pressed by nip rolls (a pressing deaeration method), or put into a rubber bag and aspirated under reduced pressure (a vacuum deaeration method). In this way, while the air remaining between the glass plate and the interlayer film is being removed, the laminate is pressure-bonded. Thereafter, by pressure-bonding the laminate by means of heating and pressing it in, for example, an autoclave, laminated glass is manufactured. In the manufacturing process of the laminated glass, deaerating properties at the time of laminating the glass with the interlayer film for laminated glass are important. For the purpose of securing the deaerating properties at the time of manufacturing the laminated glass, fine recesses and protrusions are formed on at least one surface of the interlayer film for laminated glass. Particularly, in the recesses and protrusions, if the recesses have a structure in which the recesses each have a groove shape with a continuous bottom (hereinafter, the shape will be also referred to as a "shape of an engraved line"), and the recesses adjacent to each other having the shape of engraved lines are parallel to each other and formed regularly, the interlayer film for laminated glass can exhibit extremely excellent deaerating properties.

Generally, the recesses and protrusions formed on the surface of the interlayer film for laminated glass are destroyed at the time of pressure-bonding in the manufacturing process of laminated glass. Therefore, the recesses and protrusions rarely become a problem in the obtained laminated glass.

However, the present inventors found that in the case of the interlayer film for laminated glass that includes 2 or more resin layers laminated on each other, the influence of the recesses and protrusions remains in the laminated glass obtained through the manufacturing process of laminated glass and causes the occurrence of ghost images.

That is, it is considered that when recesses and protrusions are formed on a surface of the interlayer film for laminated glass that includes 2 or more resin layers laminated on each other by using an embossing roll or the like, the recesses and protrusions are formed on the surface of the interlayer film and are also transferred to the interface between the resin layers due to the pressure at the time of working, and thus the interface becomes unsmooth. Particularly, it is considered that if the recesses having the shape of an engraved line are formed on the surface, the recesses having the shape of an engraved line are also apparently transferred to the interface between the layers. Although the recesses and protrusions on the surface of the interlayer film are destroyed at the time of pressure-bonding in the manufacturing process of laminated glass, the recesses and protrusions having been transferred to the interface between the layers remain. It is considered that due to the recesses and protrusions formed in the interface between the layers, a phenomenon of optical interference occurs, and this causes the occurrence of ghost images. Particularly, it is considered that in the interlayer film for laminated glass having excellent sound insulating properties described in PTL 1, when the recesses and protrusions are formed on a surface of a hard protective layer, the recesses and protrusions are easily transferred to the interface between the protective layer and the soft sound insulating layer, and thus ghost images particularly easily occur.

If the recesses and protrusions are not formed on the surface of the interlayer film for laminated glass, the occurrence of ghost images can be prevented. However, if the recesses and protrusions are not formed, air cannot be sufficiently removed at the time of manufacturing the laminated glass. Consequentially, air bubbles occur between the glass and the interlayer film, and thus the external appearance of the laminated glass is impaired.

The present invention has been made in consideration of the aforementioned circumstances, and objects thereof are to provide a interlayer film for laminated glass that includes 2 or more resin layers laminated on each other, which exhibits excellent deaerating properties in a manufacturing process of laminated glass, and can prevent the occurrence of ghost images, and to provide laminated glass including the interlayer film for laminated glass.

Solution to Problem

According to an aspect of the present invention, there is provided an interlayer film for laminated glass including 2 or more resin layers laminated on each other has a large number of recesses and a large number of protrusions on at least one surface thereof, the recesses each have a groove shape with a continuous bottom, the recesses adjacent to each other are parallel to each other and regularly arranged in a line, within the surface including the large number of recesses and the large number of protrusions, a groove depth (Rzg) of the recesses measured based on JIS B-0601 (1994) is 10 μm to 40 μm, and a 10-point average roughness (Rz) of a surface of a resin layer having the surface including the large number of recesses and the large number of protrusions measured based on JIS B 0601 (1994) is less than 2.7 μm, and the 10-point average roughness (Rz) is obtained by peeling off the resin layer having the surface including the large number of recesses and the large number of protrusions from another resin layer coming into direct contact with the aforementioned resin layer and then measuring the surface of the peeled off resin on a side of the aforementioned another resin layer that came into direct contact with the peeled off resin layer based on JIS B 0601 (1994).

In the aspect of the present invention, a state in which "the interlayer film has a large number of recesses and a large number of protrusions on at least one surface thereof" means that "a large number of recesses and a large number of protrusions have been formed on at least one surface of the interlayer film". Furthermore, a state in which "the recesses each have a groove shape with a continuous bottom, and the recesses adjacent to each other are parallel to each other and arranged in a line" means that "the recesses each have a groove shape with a continuous bottom, and the recesses adjacent to each other are parallel to each other and formed regularly".

Hereinafter, the present invention will be specifically described.

As a result of intensive research, the present inventors found the following fact. If recesses and protrusions are formed on a surface of the interlayer film for laminated glass to such an extent that the interlayer film can exhibit sufficient deaerating properties in the manufacturing process of laminated glass, and the roughness of the recesses and the protrusions to be transferred to the interface between a resin layer, which has the surface on which the recesses and protrusions are formed, and a resin layer which comes into direct contact with the aforementioned resin layer is kept to be equal to or less than a certain level, even in an interlayer film for laminated glass that includes 2 or more resin layers laminated on each other, both the excellent deaerating properties at the time of manufacturing laminated glass and the prevention of the occurrence of ghost images can be established. Based on this finding, the present inventors accomplished the present invention.

The interlayer film for laminated glass of the aspect of the present invention has a large number of recesses and a large number of protrusions on at least one surface thereof. Accordingly, deaerating properties can be secured at the time of manufacturing laminated glass.

The interlayer film of the present invention may have the recesses and protrusions only on one surface thereof. However, the interlayer film preferably has the recesses and protrusions on both surfaces thereof, because the deaerating properties are markedly improved.

The recesses and protrusions may have at least a shape of a groove. For example, the recesses and protrusions can have a shape that is generally given to the surface of the interlayer film for laminated glass, such as the shape of an engraved line or the shape of a lattice. The recesses and protrusions may have a shape that has been transferred from an embossing roll.

Furthermore, the top of the recesses may have a planar shape as shown in FIG. 1 or may have a non-planar shape as shown in FIG. 2. When the top of the recesses has a planar shape, fine recesses and protrusions may be further formed on the top.

In the recesses and protrusions, the heights of the protrusions may be the same as or different from each other. Moreover, the thicknesses of the recesses corresponding to the protrusions may be the same as or different from each other, as long as the bottom side of the recesses is continuous.

In the interlayer film for laminated glass of the aspect of the present invention, among the recesses and the protrusions that the interlayer film has on at least one surface thereof, the recesses each have a groove shape with a continuous bottom (a shape of an engraved lines), and the recesses adjacent to each other are parallel to each other and regularly arranged in a line. Generally, when a laminate in which an interlayer film for laminated glass has been laminated between 2 sheets of glass plates is pressure-bonded, how easily air is removed is closely related with the communication properties and smoothness of the bottom of the recesses. If the recesses and protrusions on at least one surface of the interlayer film have a shape such that the recesses having a shape of an engraved line are parallel to each other and regularly arranged in a line, the communication properties of the bottom become better, and the deaerating properties are markedly improved.

Herein, "regularly arranged in a line" means that the recesses adjacent to each other having the shape of an engraved line may be parallel to each other and arranged in a line at an equal interval. The phrase also means that although the recesses adjacent to each other having the shape of an engraved line are parallel to each other and arranged in a line, the interval between all of the recesses adjacent to each other having the shape of an engraved line may not be an equal interval.

FIGS. 1 and 2 are schematic views showing an example of an interlayer film for laminated glass in which recesses having a shape of an engraved line are parallel to each other and arranged in a line at an equal interval.

FIG. 3 is a schematic view showing an example of an interlayer film for laminated glass in which recesses having a shape of an engraved line are parallel to each other and arranged in a line at an unequal interval. In FIG. 3, an interval A between a recess 1 and a recess 2 is different from an interval B between the recess 1 and a recess 3.

Within the surface having the large number of recesses and the large number of protrusions, a groove depth (Rzg) of the recesses is 10 μm to 40 μm. If the groove depth (Rzg) is equal to or greater than 10 μm, the interlayer film can exhibit extremely excellent deaerating properties, and if it is equal to or less than 40 μm, the temperature at the time of manufacturing laminated glass can be reduced. The lower limit of the groove depth (Rzg) is preferably 15 μm, and the upper limit thereof is preferably 35 μm. The lower limit of the groove depth (Rzg) is more preferably 20 μm, and the upper limit thereof is more preferably 30 μm.

In the present specification, the groove depth (Rzg) of the recesses refers to a value obtained by calculating a groove depth based on a mean line of a roughness curve (a line set such that the sum of squares of deviation from the roughness curve is minimized) by setting a reference length specified in JIS B-0601 (1994) "Surface roughness-definition and expression" to be 2.5 mm and then calculating an average of depths of the grooves measured. The number of the grooves is an integer determined by rounding off a value, which is obtained by dividing the reference length by the interval between the recesses, below the decimal point. When the number of the grooves is equal to or greater than 5, the depths of 5 grooves present in the reference length are calculated in order from the deepest groove of the recesses, and the average thereof is taken as a groove depth per reference length. When the number of the grooves is equal to or less than 4, the depths of grooves present in the reference length are calculated in order from the deepest groove, and the average thereof is taken as a groove depth per reference length. The groove depth per reference length is measured for at least 5 grooves of the recesses, and the average thereof is taken as the groove depth (Rzg) of the recesses. The groove depth (Rzg) can be easily obtained by performing data processing on digital signals measured by using, for example, a surface roughness tester (SE1700α manufactured by Kosaka Laboratory Ltd.).

In the aspect of the present invention, as a method for forming a large number of recesses and a large number of protrusions on at least one surface of the interlayer film for laminated glass, for example, it is possible to use an embossing roll method, a calendar roll method, a profile extrusion method, or an extrusion lip embossing method utilizing melt fracture. Among these, an embossing roll method is preferable because the method makes it easy to obtain the shape in which the recesses adjacent to each other having the shape of an engraved line are parallel to each other and regularly arranged in a line.

Examples of the embossing roll used in the embossing roll method include an embossing roll having embossing patterns (patterns of recesses and protrusions) on the roll surface that are formed by performing blasting processing on the surface of a metal roll by using a grinding material such as aluminum oxide or silicon oxide and then performing lapping on the surface by means of vertical grinding or the like so as to reduce excess peaks on the surface. Examples of the embossing roll also include an embossing roll having embossing patterns (patterns of recesses and protrusions) on the roll surface that are formed by transferring embossing patterns (patterns of recesses and protrusions) of an engraving mill (mother mill) to the surface of a metal roll, an embossing roll having embossing patterns (patterns of recesses and protrusions) on the roll surface that are formed by etching, and the like.

In the interlayer film for laminated glass of the aspect of the present invention, a 10-point average roughness (Rz) of the surface of the resin layer having the large number of recesses and the large number of protrusions (hereinafter, the resin layer will be also referred to as a "resin layer with the surface having recesses and protrusions") measured based on JIS B 0601 (1994) is less than 2.7 μm. The 10-point average roughness (Rz) is obtained by peeling off the resin layer with the surface having recesses and protrusions from another resin layer coming into direct contact with the aforementioned resin layer and then measuring the surface of the peeled off resin layer with the surface having recesses and protrusions that came into contact with the aforementioned other resin layer based on JIS B 0601 (1994).

As described above, although the recesses and protrusions having been transferred to the interface between the resin layers are the cause of the occurrence of ghost images and the like, it is extremely difficult to directly observe the recesses and protrusions of the interface between the resin layers. The recesses and protrusions having been transferred to the interface between the resin layers can be indirectly evaluated by peeling off the resin layer coming into direct contact with another resin layer and measuring the 10-point average roughness of the surface of the peeled off resin layer, instead of by directly observing the recesses and protrusions of the interface between the resin layer. Moreover, by adjusting the roughness of the recesses and protrusions to be lower than a certain level, the occurrence of ghost images caused by the transferred recesses and protrusions can be inhibited.

The interlayer film for laminated glass shown in FIG. 4 is an interlayer film for laminated glass having a 2-layered structure in which a resin layer 20, which has a surface 21 having a large number of recesses and a large number of protrusions, and a resin layer 10 have been laminated onto each other. In the present invention, the resin layer 20 is peeled off from the resin layer 10 of the interlayer film for laminated glass having the 2-layered structure, and then the 10-point average roughness (Rz) of a surface 22 of the peeled off resin layer 20 on the side that came into contact with the resin layer 10 is measured.

The interlayer film for laminated glass shown in FIG. 5 is an interlayer film for laminated glass having a 3-layered structure in which the resin layer 20, which has the surface 21 having the large number of recesses and the large number of protrusions, the resin layer 10, and a resin layer 30 have been laminated on each other in this order. In the present invention, the resin layer 20 is peeled off from the resin layer 10 of the interlayer film for laminated glass having the 3-layered structure, and then the 10-point average roughness (Rz) of the surface 22 of the peeled off resin layer 20 on the side that came into contact with the resin layer 10 is measured.

The peeling off of the resin layer coming into direct contact with another resin layer is performed under conditions of a rate of 10 cm/s to 15 cm/s in an environment with a temperature of 25° C. and a humidity of 30%. If the temperature, the humidity, and the peeling off rate are kept constant, the variation of the measured value can be inhibited. The peeling off may be performed by using a machine or may be manually performed by using a finger, as long as the aforementioned conditions are satisfied.

If the 10-point average roughness is measured immediately after the peeling off of the resin layer coming into direct contact with another resin layer is performed, variation may occur in the measured values. Accordingly, the 10-point average roughness is preferably measured after the peeled off resin layer is allowed to stand for 2 hours in an environment with a temperature of 25° C. and a humidity of 30%.

The resin layer with the surface having recesses and protrusions is peeled off under a certain condition described above and is allowed to stand, and then the 10-point average roughness of the surface of the peeled off resin layer with the surface having recesses and protrusions on the side that came into contact with another resin layer is measured.

In the present specification, the 10-point average roughness is measured based on the method specified by JIS B 0601 (1994) "Surface roughness-definition and expression". Furthermore, the 10-point average roughness can be easily measured by using, for example, a high-precision profilometry system (manufactured by KEYENCE CORPORATION, "KS-1100" equipped with a tip head of "LT-9510VM" model).

The 10-point average roughness of the peeled off resin layer with the surface having recesses and protrusions on the side that came into contact with another resin layer is less than 2.7 μm. If the 10-point average roughness is less than 2.7 μm, the occurrence of ghost images can be inhibited. The 10-point average roughness is preferably equal to or less than 2.3 μm, more preferably equal to or less than 1.9 μm, and even more preferably equal to or less than 1.7 μm. If the 10-point average roughness is equal to or less than the aforementioned preferred upper limit, the occurrence of ghost images can be further inhibited. The lower limit of the 10-point average roughness is not particularly limited. However, it is preferably equal to or greater than 0.001 μm.

In order to make the 10-point average roughness of the surface of the peeled off resin layer with the surface having recesses and protrusions on the side that came into contact with another resin layer less than 2.7 μm, for example, (1) a method of increasing the thickness of the resin layer with the surface having recesses and protrusions, (2) a method of decreasing the groove depth (Rzg) of the grooves present on the surface, (3) a method of dispersing pressure at the time of forming the recesses by narrowing the interval between the recesses present on the surface that are adjacent to each other and have the shape of an engraved line (hereinafter, the interval will be also referred to as an "interval between recesses"), (4) a method of reducing a press pressure or a linear press pressure at the time of forming the recesses and protrusions on the surface, and the like may be used in combination.

If the thickness of the resin layer with the surface having recesses and protrusions is increased, when the recesses and protrusions are formed on the surface by using an embossing roll or the like, the pressure applied to the resin layer coming into direct contact with another resin layer is reduced, and thus the transfer of the recesses and protrusions to the interface can be inhibited. That is, in order to make the 10-point average roughness of the surface of the peeled off resin layer with the surface having recesses and protrusions on the side that came into contact with another resin layer less than 2.7 μm, the thickness of the resin layer with the surface having recesses and protrusions is preferably increased as much as possible, within a range that does not impair the purpose of establishing a multilayer structure.

The thickness of the resin layer with the surface having recesses and protrusions, which is for making the 10-point average roughness of the peeled off resin layer with the surface having recesses and protrusions on the side that came into contact with another resin layer less than 2.7 μm, is not particularly limited and is determined according to the material or the like of the resin layer with the surface having recesses and protrusions or the material of the resin layer coming into direct contact with the aforementioned resin layer. However, in a general interlayer film for laminated glass, the thickness of the resin layer with the surface having recesses and protrusions is preferably 100 μm to 500 μm, and more preferably 300 μm to 500 μm. For example, when recesses and protrusions are formed on a surface of a protective layer in a sound insulating interlayer film which will be described later, the thickness of the protective layer is preferably equal to or greater than 100 μm. If the thickness of the protective layer is equal to or greater than 100 μm, the transfer of the recesses and protrusions to the interface can be inhibited. The thickness of the protective layer is more preferably equal to or greater than 300 μm, even more preferably equal to or greater than 400 μm, and particularly preferably equal to or greater than 450 μm. The upper limit of the thickness of the protective layer is not particularly limited. However, in order to make the sound insulating layer have such a thickness that the layer can accomplish sufficient sound insulating properties, the upper limit is substantially 500 μm.

The 10-point average roughness of the surface of the peeled off resin layer with the surface having recesses and protrusions on the side that came into contact with another resin layer can be reduced by reducing the groove depth (Rzg). In order to make the interlayer film for laminated glass exhibit excellent deaerating properties at the time of pressure-bonding as described above, the groove depth (Rzg) needs to be equal to or greater than 10 μm. However, if the groove depth is reduced as much as possible within a range satisfying the aforementioned groove depth, the transfer of the recesses and protrusions to the interface between the resin layers can be inhibited.

The 10-point average roughness of the surface of the peeled off resin layer with the surface having recesses and protrusions on the side that came into contact with another resin layer can also be reduced by narrowing the interval between the recesses having the shape of an engraved line.

The interval between the recesses having the shape of an engraved line, which is for making the 10-point average roughness of the surface of the peeled off resin layer with the surface having recesses and protrusions on the side that came into contact with another resin layer less than 2.7 μm, is not particularly limited and is determined according to the material or the like of the resin layer with the surface having recesses and protrusions or the material of the resin layer coming into direct contact with the aforementioned resin layer. However, in a general interlayer film for laminated glass, the interval between the recesses is preferably equal to or less than 500 μm. For example, when recesses and protrusions are formed on a surface of a protective layer in a sound insulating interlayer film which will be described later, the interval between the recesses having the shape of an engraved line is preferably equal to or less than 500 μm. If the interval between the recesses having the shape of an engraved line is equal to or less than 500 μm, the transfer of the recesses and protrusions to the interface between the resin layers can be inhibited. The interval between the recesses having the shape of an engraved line is more preferably equal to or less than 400 μm, even more preferably equal to or less than 300 μm, and most preferably equal to or less than 250 μm. The lower limit of the interval between the recesses having the shape of an engraved line is not particularly limited. However, from the viewpoint of workability at the time of manufacturing laminated glass, the lower limit is substantially 10 μm.

In the present specification, the interval between the recesses having the shape of an engraved line means the shortest distance between the very bottom portions of two recesses adjacent to each other having the shape of an engraved line. Specifically, in order to determine the interval between the recesses, the surface (an observation range of 20 mm×20 mm) of the interlayer film for laminated glass is observed with an optical microscope (for example, BS-8000III manufactured by SONIC-GROUP), and all of the shortest distances between the very bottom portions of the observed recesses adjacent to each other are measured. Subsequently, the average of the measured shortest distances is calculated and taken as the interval between the recesses. Herein, the maximum value of the measured shortest distances may be taken as the interval between the recesses. The interval between the recesses may be the average of the shortest distances or the maximum value of the shortest distances. However, it is preferably the average of the shortest distances.

The 10-point average roughness of the surface of the peeled off resin layer with the surface having recesses and protrusions on the side that came into contact with another resin layer can also be reduced by adjusting the press pressure or the linear press pressure at the time of forming the recesses and protrusions on the surface.

For example, when the recesses and protrusions are formed on the surface by using an embossing roll, as a transfer condition, the temperature of the interlayer film for laminated glass, roll temperature, linear velocity, press pressure, or linear press pressure is adjusted. At this time, if the transfer condition such as the press pressure or the linear press pressure is adjusted, the transfer of the recesses and protrusions to the interface between the resin layers can also be inhibited.

In the interlayer film for laminated glass of the aspect of the present invention, 2 or more resin layers have been laminated on each other. For example, if the interlayer film has a first resin layer and a second resin layer as the 2 or more resin layers, and the properties of the first resin layer are different from the properties of the second resin layer, an interlayer film for laminated glass can be provided which has various performances that are not easily realized with only a single layer. However, when 2 or more resin layers are laminated on each other, the problem of a ghost image occurs.

The resin layers preferably contain a thermoplastic resin.

Examples of the thermoplastic resin include polyvinylidene fluoride, polytetrafluoroethylene, a vinylidene fluoride-propylene hexafluoride copolymer, polyethylene trifluoride, an acrylonitrile-butadiene-styrene copolymer, polyester, polyether, polyamide, polycarbonate, polyacrylate, polymethacrylate, polyvinyl chloride, polyethylene, polypropylene, polystyrene, polyvinyl acetal, an ethylene-vinyl acetate copolymer, and the like. Among these, the resin layers preferably contain polyvinyl acetal or an ethylene-vinyl acetate copolymer, and more preferably contain polyvinyl acetal.

The resin layers preferably contain polyvinyl acetal and a plasticizer.

The plasticizer is not particularly limited as long as it is a plasticizer generally used in an interlayer film for laminated glass. Examples thereof include organic plasticizers such as a monobasic organic acid ester and a polybasic organic acid ester, phosphoric acid plasticizers such as an organic phosphoric acid compound and an organic phosphorous acid compound, and the like.

Examples of the organic plasticizers include triethylene glycol-di-2-ethyl hexanoate, triethylene glycol-di-2-ethyl butyrate, triethylene glycol-d-n-heptanoate, tetraethylene glycol-di-2-ethyl hexanoate, tetraethylene glycol-di-2-ethyl butyrate, tetraethylene glycol-di-n-heptanoate, diethylene glycol-di-2-ethyl hexanoate, diethylene glycol-di-2-ethyl butyrate, diethylene glycol-di-n-heptanoate, and the like. Among these, the resin layers preferably contain triethylene glycol-di-2-ethyl hexanoate, triethylene glycol-di-2-ethyl butyrate, or triethylene glycol-di-n-heptanoate, and more preferably contain triethylene glycol-di-2-ethyl hexanoate.

The resin layers preferably contain an adhesion adjuster. Particularly, the resin layer, which comes into contact with glass when laminated glass is manufactured, preferably contains the adhesion adjuster.

As the adhesion adjuster, for example, an alkali metal salt or an alkaline earth metal salt is preferably used. Examples of the adhesion adjuster include a salt such as sodium, potassium, or magnesium.

Examples of an acid constituting the salt include an organic acid of carboxylic acid such as octylic acid, hexylic acid, 2-ethyl butyrate, butyric acid, acetic acid, or formic acid and an inorganic acid such as hydrochloric acid or nitric acid. The resin layer which comes into contact with glass preferably contains a magnesium salt as the adhesion adjuster, since the adhesion between the glass and the resin layer can be easily adjusted when laminated glass is manufactured.

If necessary, the resin layers may contain additives such as an antioxidant, a light stabilizer, modified silicone oil as an adhesion adjuster, a flame retardant, an antistatic agent, a moisture proofing agent, a heat ray-reflecting agent, and a heat ray-absorbing agent.

The interlayer film for laminated glass of the aspect of the present invention preferably has at least the first resin layer and the second resin layer as the 2 or more resin layers, and the amount of hydroxyl groups of polyvinyl acetal contained in the first resin layer (hereinafter, the polyvinyl acetal will be referred to as polyvinyl acetal A) is preferably different from the amount of hydroxyl groups of polyvinyl acetal contained in the second resin layer (hereinafter, the polyvinyl acetal will be referred to as polyvinyl acetal B).

Because the properties of the polyvinyl acetal A are different from the properties of the polyvinyl acetal B, an interlayer film for laminated glass can be provided which has various performances that are not easily realized with only a single layer. For example, when the first resin layer is laminated between 2 second resin layers described above, and the amount of hydroxyl groups of the polyvinyl acetal A is smaller than the amount of the hydroxyl groups of the polyvinyl acetal B, a glass transition temperature of the first resin layer tends to be lower than that of the second resin layer. As a result, the first resin layer becomes softer than the second resin layer, and the sound insulating properties of the interlayer film for laminated glass are improved. Furthermore, when the first resin layer is laminated between 2 second resin layers described above, and the amount of hydroxyl groups of the polyvinyl acetal A is greater than the amount of hydroxyl groups of the polyvinyl acetal B, a glass transition temperature of the first resin layer tends to be higher than that of the second resin layer. As a result, the first resin layer becomes harder than the second resin layer, and thus penetration resistance of the interlayer film for laminated glass is improved.

Further, when the first resin layer and the second resin layer include a plasticizer, it is preferable that the content of the plasticizer in the first resin layer with respect to 100 parts by mass of the polyvinyl acetal (hereinafter, the content will be referred to as a content A) is different from the content of the plasticizer in the second resin layer with respect to 100 parts of the polyvinyl acetal (hereinafter, the content will be referred to as a content B). For example, when the first resin layer is laminated between 2 second resin layers described above, and the content A is greater than the content B, the glass transition temperature of the first resin layer tends to be lower than that of the second resin layer. As a result, the first resin layer becomes softer than the second resin layer, and the sound insulating properties of the interlayer film for laminated glass are improved. Furthermore, when the first resin layer is laminated between 2 second resin layers described above, and the content A is smaller than the content B, the glass transition temperature of the first resin layer tends to be higher than that of the second resin layer. As a result, the first resin layer becomes harder than the second resin layer, and penetration resistance of the interlayer film for laminated glass is improved.

Examples of the combination of the 2 or more resin layers constituting the interlayer film for laminated glass of the aspect of the present invention include a combination of a sound insulating layer as the first resin layer and a protective layer as the second resin layer, which is a combination for improving the sound insulating properties of laminated glass. The sound insulating layer preferably contains polyvinyl acetal X and a plasticizer, and the protective layer preferably contains polyvinyl acetal Y and a plasticizer, because the sound insulating properties of the laminated glass are improved. Moreover, if the sound insulating layer is interposed between the 2 protective layers described above, an interlayer film for laminated glass having excellent sound insulating properties can be obtained (hereinafter, the interlayer film will be also referred to as a sound insulating interlayer film). In the invention of the present application, even when resin layers having different properties, such as the sound insulating layer and the protective layer, are laminated on each other, it is possible to obtain an interlayer film for laminated glass that can prevent the occurrence of ghost images. Hereinafter, the sound insulating interlayer film will be more specifically described.

In the sound insulating interlayer film, the sound insulating layer plays a role of giving sound insulating properties.

The sound insulating layer preferably contains the polyvinyl acetal X and a plasticizer.

The polyvinyl acetal X can be prepared by acetalizing polyvinyl alcohol by using aldehyde. Generally, the polyvinyl alcohol is obtained by saponifying polyvinyl acetate.

The lower limit of an average degree of polymerization of the polyvinyl alcohol is preferably 200, and the upper limit thereof is preferably 5,000. If the average degree of polymerization of the polyvinyl alcohol is equal to or greater than 200, the penetration resistance of the obtained sound insulating interlayer film can be improved, and if it is equal to or less than 5,000, moldability of the sound insulating layer can be secured. The lower limit of the average degree of polymerization of the polyvinyl alcohol is more preferably 500, and the upper limit thereof is more preferably 4,000.

Herein, the average degree of polymerization of the polyvinyl alcohol is determined by the method based on JIS K6726 "Testing methods for polyvinyl alcohol".

The lower limit of the number of carbon atoms of aldehyde for acetalizing the polyvinyl alcohol is preferably 4, and the upper limit thereof is preferably 6. If the number of carbon atoms of the aldehyde is equal to or greater than 4, a sufficient amount of the plasticizer can be stably contained in the sound insulating layer, and thus the sound insulating interlayer film can demonstrate excellent sound insulating performance. Furthermore, bleeding out of the plasticizer can be prevented. If the number of carbon atoms of the aldehyde is equal to or less than 6, the polyvinyl acetal X is easily synthesized, and thus the productivity can be secured.

The aldehyde having 4 to 6 carbon atoms may be linear or branched aldehyde, and examples thereof include n-butyl aldehyde, n-valeraldehyde, and the like.

The upper limit of the amount of hydroxyl groups of the polyvinyl acetal X is preferably 30 mol %. If the amount of hydroxyl groups of the polyvinyl acetal X is equal to or less than 30 mol %, the plasticizer can be contained in the sound insulating layer in an amount necessary for the sound insulating interlayer film to exhibit sound insulating properties, and bleeding out of the plasticizer can be prevented. The upper limit of the amount of hydroxyl groups of the polyvinyl acetal X is more preferably 28 mol %, even more preferably 26 mol %, and particularly preferably 24 mol %. The lower limit of the amount of hydroxyl groups of the polyvinyl acetal X is preferably 10 mol %, more preferably 15 mol %, and even more preferably 20 mol %.

The amount of hydroxyl groups of the polyvinyl acetal X is a value determined by expressing a molar fraction, which is obtained by dividing the amount of ethylene groups bonded to hydroxyl groups by the total amount of ethylene groups of a main chain, by percentage (mol %). The amount of ethylene groups bonded to hydroxyl groups can be determined by measuring the amount of ethylene groups bonded to hydroxyl groups of the polyvinyl acetal X by using, for example, the method based on JIS K6728 "Testing methods for polyvinyl butyral".

The lower limit of the amount of acetal groups of the polyvinyl acetal X is preferably 60 mol %, and the upper limit thereof is preferably 85 mol %. If the amount of acetal groups of the polyvinyl acetal X is equal to or greater than 60 mol %, hydrophobicity of the sound insulating layer can be improved, the plasticizer can be contained in the sound insulating layer in an amount necessary for the sound insulating interlayer film to exhibit sound insulating properties, and bleeding out or whitening of the plasticizer can be prevented. If the amount of acetal groups of the polyvinyl acetal X is equal to or less than 85 mol %, the polyvinyl acetal X can be easily synthesized, and thus the productivity can be secured. The lower limit of the amount of acetal groups of the polyvinyl acetal X is more preferably 65 mol %, and even more preferably equal to or greater than 68 mol %.

The amount of acetal groups can be determined by measuring the amount of ethylene groups bonded to acetal groups of the polyvinyl acetal X by the method based on JIS K6728 "Testing methods for polyvinyl butyral".

The lower limit of the amount of acetyl groups of the polyvinyl acetal X is preferably 0.1 mol %, and the upper limit thereof is preferably 30 mol %. If the amount of acetyl groups of the polyvinyl acetal X is equal to or greater than 0.1 mol %, the plasticizer can be contained in the sound insulating layer in an amount necessary for the sound insulating interlayer film to exhibit sound insulating properties, and bleeding out can be prevented. Furthermore, if the amount of acetyl groups of the polyvinyl acetal X is equal to or less than 30 mol %, hydrophobicity of the sound insulating layer can be improved, and whitening can be prevented. The lower limit of the amount of acetyl groups is more preferably 1 mol %, even more preferably 5 mol %, and particularly preferably 8 mol %. The upper limit of the amount of acetyl groups is more preferably 25 mol %, and even more preferably 20 mol %. The amount of acetyl groups is a value determined by expressing a molar fraction, which is obtained by dividing a value obtained by subtracting the amount of ethylene groups bonded to acetal groups and the amount of ethylene groups bonded to hydroxyl groups from the total amount of ethylene groups of a main chain by the total amount of ethylene groups of the main chain, by percentage (mol %).

Particularly, the polyvinyl acetal X is preferably polyvinyl acetal in which the amount of acetyl groups is equal to or greater than 8 mol %, or polyvinyl acetal in which the amount of acetyl groups is less than 8 mol % and the amount of acetal groups is equal to or greater than 65 mol %, because the plasticizer can be easily contained in the sound insulating layer in an amount necessary for the sound insulating interlayer film to exhibit sound insulating properties. The polyvinyl acetal X is more preferably polyvinyl acetal in which the amount of acetyl groups is equal to or greater than 8 mol %, or polyvinyl acetal in which the amount of acetyl groups is less than 8 mol % and the amount of acetal groups is equal to or greater than 68 mol %.

The lower limit of the content of the plasticizer in the sound insulating layer is preferably 45 parts by mass, and the upper limit thereof is preferably 80 parts by mass, with respect to 100 parts by mass of the polyvinyl acetal X. If the content of the plasticizer is equal to or greater than 45 parts by mass, the sound insulating interlayer film can exhibit a high degree of sound insulating properties, and if the content is equal to or less than 80 parts by mass, it is possible to prevent the transparency or adhesiveness of the interlayer film for laminated glass from deteriorating due to the occurrence of bleeding out of the plasticizer. The lower limit of the content of the plasticizer is more preferably 50 parts by mass, and even more preferably 55 parts by mass. The upper limit of the content of the plasticizer is more preferably 75 parts by mass, and even more preferably 70 parts by mass.

The lower limit of the thickness of the sound insulating layer is preferably 50 µm. If the thickness of the sound insulating layer is equal to or greater than 50 µm, the sound insulating interlayer film can exhibit sufficient sound insulating properties. The lower limit of the thickness of the sound insulating layer is more preferably 80 µm. The upper limit thereof is not particularly limited. However, considering the thickness of interlayer film for laminated glass, the upper limit is preferably 300 µm.

The protective layer plays a role of preventing the adhesiveness between the interlayer film for laminated glass and glass from deteriorating due to the bleeding out of a large amount of the plasticizer contained in the sound insulating layer, and giving penetration resistance to the interlayer film for laminated glass.

The protective layer preferably contains, for example, polyvinyl acetal Y and a plasticizer, and more preferably contains the polyvinyl acetal Y, which contains more hydroxyl groups than the polyvinyl acetal X, and a plasticizer.

The polyvinyl acetal Y can be prepared by acetalizing polyvinyl alcohol by using aldehyde.

Generally, the polyvinyl alcohol is obtained by saponifying polyvinyl acetate.

The lower limit of an average degree of polymerization of the polyvinyl alcohol is preferably 200, and the upper limit thereof is preferably 5,000. If the average degree of polymerization of the polyvinyl alcohol is equal to or greater than 200, the penetration resistance of the obtained interlayer film for laminated glass can be improved, and if it is equal to or less than 5,000, moldability of the protective layer can be secured. The lower limit of the average degree of polymerization of the polyvinyl alcohol is more preferably 500, and the upper limit thereof is more preferably 4,000.

The lower limit of the number of carbon atoms of aldehyde for acetalizing the polyvinyl alcohol is preferably 3, and the upper limit thereof is preferably 4. If the number of carbon atoms of the aldehyde is equal to or greater than 3, the penetration resistance of the interlayer film for laminated glass is improved. If the number of carbon atoms of the aldehyde is equal to or less than 4, the productivity of the polyvinyl acetal Y is improved.

The aldehyde having 3 to 4 carbon atoms may be linear or branched aldehyde, and examples thereof include n-butyl aldehyde and the like.

The upper limit of the amount of hydroxyl groups of the polyvinyl acetal Y is preferably 33 mol %, and the lower limit thereof is preferably 28 mol %. If the amount of hydroxyl groups of the polyvinyl acetal Y is equal to or less than 33 mol %, whitening of the interlayer film for laminated glass can be prevented. If the amount of hydroxyl groups of the polyvinyl acetal Y is equal to or greater than 28 mol %, the penetration resistance of the interlayer film for laminated glass is improved.

In the polyvinyl acetal Y, the lower limit of the amount of acetal groups is preferably 60 mol %, and the upper limit thereof is preferably 80 mol %. If the amount of acetal groups is equal to or greater than 60 mol %, the plasticizer can be contained in the protective layer in an amount necessary for the interlayer film for laminated glass to exhibit sufficient penetration resistance. If the amount of acetal groups is equal to or less than 80 mol %, the adhesion between the protective layer and glass can be secured. The lower limit of the amount of acetal groups is more preferably 65 mol %, and the upper limit thereof is more preferably 69 mol %.

The upper limit of the amount of actyl groups of the polyvinyl acetal Y is preferably 7 mol %. If the amount of acetyl groups of the polyvinyl acetal Y is equal to or less than 7 mol %, hydrophobicity of the protective layer is improved, and thus whitening can be prevented. The upper limit of the amount of acetyl groups is more preferably 2 mol %, and the lower limit thereof is preferably 0.1 mol %. Herein, the amount of hydroxyl groups, the amount of acetal groups, and the amount of acetyl groups in the polyvinyl acetals A, B, and Y can be measured by the same method as the polyvinyl acetal X.

The lower limit of the content of the plasticizer in the protective layer is preferably 20 parts by mass, and the upper limit thereof is preferably 45 parts by mass, with respect to 100 parts by mass of the polyvinyl acetal Y. If the content of the plasticizer is equal to or greater than 20 parts by mass, the penetration resistance can be secured. If the content of the plasticizer is equal to or less than 45 parts by mass, bleeding out of the plasticizer can be prevented, and thus the deterioration of transparency or adhesiveness of the interlayer film for laminated glass can be prevented. The lower limit of the content of the plasticizer is more preferably 30 parts by mass, and even more preferably 35 parts by mass. The upper limit thereof is more preferably 43 parts by mass, and even more preferably 41 parts by mass. The content of the plasticizer in the protective layer is preferably lower than the content of the plasticizer in the sound insulating layer, because the sound insulating properties of laminated glass are further improved.

The amount of hydroxyl groups of the polyvinyl acetal Y is preferably greater than the amount of hydroxyl groups of the polyvinyl acetal X, because the sound insulating properties of laminated glass are further improved. The amount of hydroxyl groups of the polyvinyl acetal Y is greater than the amount of hydroxyl groups of the polyvinyl acetal X, more preferably by not less than 1 mol %, even more preferably by not less than 5 mol %, and particularly preferably by not less than 8 mol %. If the amount of hydroxyl groups of the polyvinyl acetal X and the polyvinyl acetal Y is adjusted, the content of the plasticizer in the sound insulating layer and the protective layer can be controlled, and the glass transition temperature of the sound insulating layer is reduced. As a result, the sound insulating properties of laminated glass are further improved.

The content (hereinafter, also referred to as a content X) of the plasticizer with respect to 100 parts by mass of the polyvinyl acetal X in the sound insulating layer is preferably greater than the content (hereinafter, also referred to as a content Y) of the plasticizer with respect to 100 parts by mass of the polyvinyl acetal Y in the protective layer, because the sound insulating properties of laminated glass are further improved. The content X is greater than the content Y, more preferably by not less than 5 parts by mass, even more preferably by not less than 15 parts by mass, and particularly preferably by not less than 20 parts by mass. If the content X and the content Y are adjusted, the glass transition temperature of the sound insulating layer is reduced. As a result, the sound insulating properties of laminated glass are further improved.

The thickness of the protective layer is not particularly limited and just needs to be adjusted within a range in which the protective layer can perform its role. Here, when the protective layer has recesses and protrusions on the surface thereof, it is preferable that the thickness of the protective layer as great as possible, such that the recesses and protrusions are inhibited from being transferred to the interface between the protective layer and the sound insulating layer coming into direct contact with the protective layer. Specifically, the lower limit of the thickness of the protective layer is preferably 100 µm, more preferably 300 µm, even more preferably 400 µm, and particularly preferably 450 µm. The upper limit of the thickness of the protective layer is not particularly limited. However, in order to make the sound insulating layer have such a thickness that the layer can provide sufficient sound insulating properties, the upper limit of the thickness of the protective layer is substantially about 500 µm.

The method for manufacturing the sound insulating interlayer film is not particularly limited. Examples of the method include a method of forming the sound insulating layer and the protective layer in the form of a sheet by means of a general film forming method such as an extrusion method, a calendar method, or a spray method, and then laminating the sound insulating layer and the protective layer on each other.

According to the another aspect of the present invention, there is provided an interlayer film for laminated glass including 2 protective layers and a sound insulating layer laminated between the protective layers, in which the sound insulating layer contains a plasticizer in an amount of 45 parts by mass to 80 parts by mass with respect to 100 parts by mass of polyvinyl acetal, the protective layers contain a plasticizer in an amount of 20 parts by mass to 45 parts by mass with respect to 100 parts by mass of polyvinyl acetal, the protective layers have a large number of recesses and a large number of protrusions on at least one surface thereof, the recesses each have a groove shape with a continuous bottom, the recesses adjacent to each other are parallel to each other and regularly arranged in a line, within the surface of the protective layers having the large number of recesses and the large number of protrusions, a groove depth (Rzg) of the recesses measured based on JIS B-0601 (1994) is 10 µm to 40 µm, a 10-point average roughness (Rz) of a surface of the protective layer having the surface including the large number of recesses and the large number of protrusions measured based on JIS B 0601 (1994) is less than 2.7 µm, and the 10-point average roughness (Rz) is obtained by peeling off the protective layer having the surface including the large number of recesses and the large number of protrusions from the sound insulating layer and then measuring the surface of the peeled off protective layer on a side of the sound insulating layer based on JIS B 0601 (1994).

In the present invention, the state in which "the protective layer has a large number of recesses and a large number of protrusions on at least one surface thereof" refers to a state in which "a large number of recesses and a large number of protrusions have been formed on at least one surface of the protective layer". Furthermore, the state in which "the recesses each have a groove shape with a continuous bottom, and the recesses adjacent to each other are parallel to each other and regularly arranged in a line" refers to a state in which "the recesses each have a groove shape with a continuous bottom, and the recesses adjacent to each other are parallel to each other and formed regularly".

According to still another aspect of the present invention, there is provided laminated glass in which the interlayer film for laminated glass of the present invention is laminated between a pair of glass plates.

As the glass plates, it is possible to use generally used transparent plate glass. Examples thereof include float plate glass, polished plate glass, figured glass, wire-reinforced glass, wired plate glass, stained plate glass, heat ray-absorbing glass, heat ray-reflecting glass, and inorganic glass such as green glass. Furthermore, it is possible to use UV shielding glass in which a UV shielding coating is provided on the surface of glass. In addition, organic plastic plates such as polyethylene terephthalate, polycarbonate, and polyacrylate can be used.

As the aforementioned glass plates, two or more kinds of glass plates may be used. Examples thereof include laminated glass in which the interlayer film for laminated glass of the present invention is laminated between transparent plate glass and a stained glass plate such as green glass. Moreover, as the glass plates, two or more kinds of glass plates having different thicknesses may be used.

The method for manufacturing the laminated glass of the aspect of the present invention is not particularly limited, and methods known in the related art can be used.

Advantageous Effects of Invention

According to the aspect of the present invention, it is possible to provide an interlayer film for laminated glass that includes 2 or more resin layers laminated on each other, exhibits excellent deaerating properties in a manufacturing process of laminated glass, and can prevent the occurrence of ghost images, and to provide laminated glass including the interlayer film for laminated glass.

DESCRIPTION OF EMBODIMENTS

Figure 1:
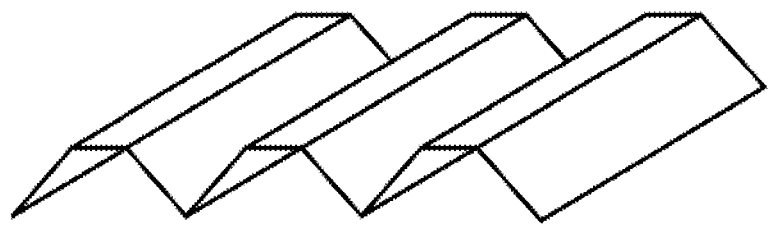
FIG. 1 is schematic view showing an example of an interlayer film for laminated glass, in which recesses each having a groove shape with a continuous bottom are formed on the surface thereof at an equal interval, and the recesses adjacent to each other are parallel to each other and arranged in a line.
Figure 2:
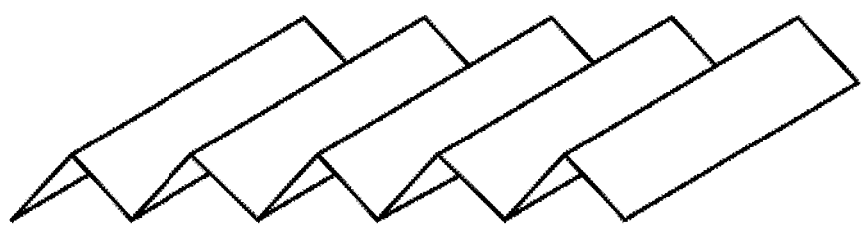
FIG. 2 is a schematic view showing an example of the interlayer film for laminated glass, in which recesses each having a groove shape with a continuous bottom are formed on the surface thereof at an equal interval, and the recesses adjacent to each other are parallel to each other and arranged in a line.
Figure 3:
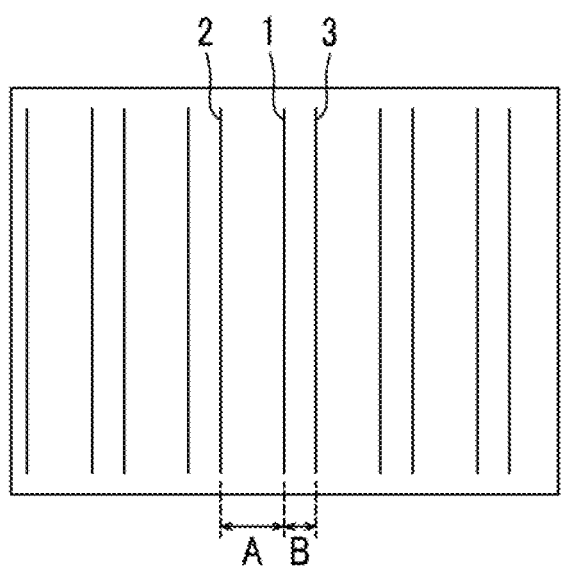
FIG. 3 is a schematic view showing an example of the interlayer film for laminated glass, in which recesses each having a groove shape with a continuous bottom are formed on the surface thereof at an unequal interval, and the recesses adjacent to each other are parallel to each other and arranged in a line.
Figure 4:
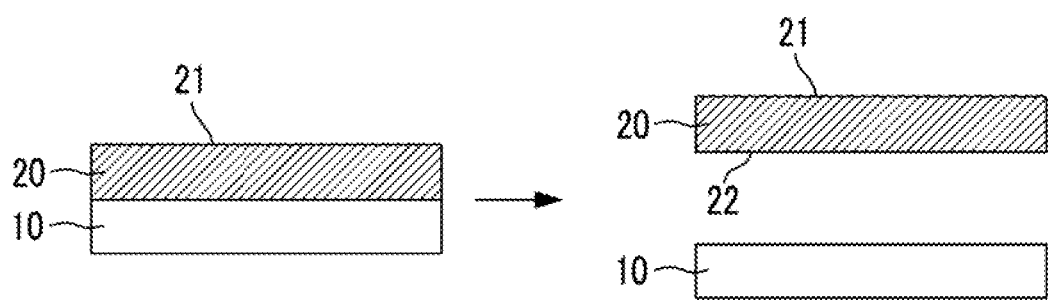
FIG. 4 is a schematic view illustrating the interlayer film for laminated glass having a 2-layered structure, and a surface thereof in which a 10-point average roughness (Rz) is measured.
Figure 5:
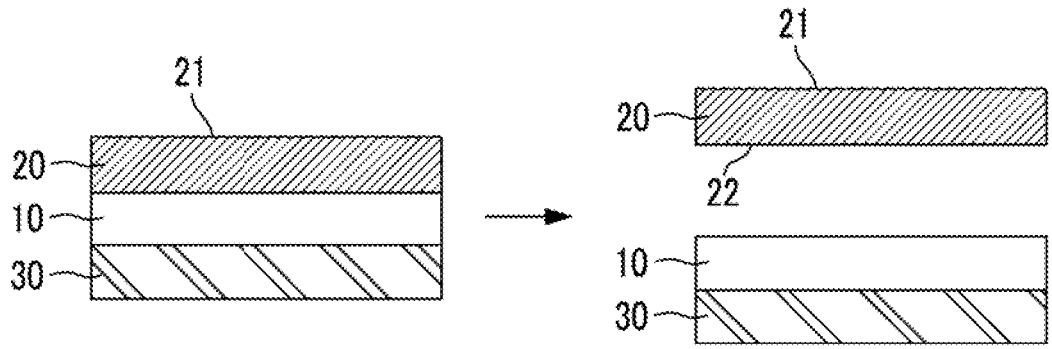
FIG. 5 is a schematic view illustrating the interlayer film for laminated glass having a 3-layered structure, and a surface thereof in which a 10-point average roughness (Rz) is measured.

Hereinafter, embodiments of the present invention will be more specifically described based on examples, but the present invention is not limited to the examples.

Example 1

(1) Preparation of Resin Composition for Sound Insulating Layer

As a plasticizer, 60 parts by mass of triethylene glycol-di-2-ethyl hexanoate (3GO) was added to 100 parts by mass of polyvinyl butyral (an amount of acetyl groups: 12 mol %, an amount of butyral groups: 66 mol %, an amount of hydroxyl groups: 22 mol %) which was obtained by acetalizing polyvinyl alcohol having an average degree of polymerization of 2,400 by using n-butyl aldehyde, and the resultant was thoroughly kneaded by using a mixing roll, thereby obtaining a resin composition for a sound insulating layer.

(2) Preparation of Resin Composition for Protective Layer

As a plasticizer, 40 parts by mass of triethylene glycol-di-2-ethyl hexanoate (3GO) was added to 100 parts by mass of polyvinyl butyral (an amount of acetyl groups: 1 mol %, an amount of butyral groups: 69 mol %, an amount of hydroxyl groups: 30 mol %) which was obtained by acetalizing polyvinyl alcohol having an average degree of polymerization of 1,700 by using n-butyl aldehyde, and the resultant was thoroughly kneaded by using a mixing roll, thereby obtaining a resin composition for a protective layer.

(3) Preparation of Interlayer Film for Laminated Glass

The obtained resin composition for a sound insulating layer and resin composition for a protective layer were coextruded by using a coextruder, thereby obtaining an interlayer film for laminated glass (sound insulating interlayer film) having a 3-layered structure in which a layer A (protective layer) formed of the resin composition for a protective layer and having a thickness of 450 μm, a layer B (sound insulating layer) formed of the resin composition for a sound insulating layer and having a thickness of 100 μm, and a layer C (protective layer) formed of the resin composition for a protective layer and having a thickness of 450 μm were laminated on each other in this order.

(4) Formation of Recesses and Protrusions

As a first step, the shape of random recesses and protrusions was transferred to both surfaces of the interlayer film for laminated glass according to the following procedure. First, by using a blasting agent, random recesses and protrusions were formed on the surface of an iron roll, and then vertical grinding was performed on the iron roll. Furthermore, by using a finer blasting agent, fine recesses and protrusions were formed on a flat portion formed after the grinding. As a result, a pair of rolls of the same shape having both the coarse main embossments and fine sub-embossments was obtained. By using the pair of rolls as a device for transferring the shape of recesses and protrusions, the shape of random recesses and protrusions was transferred to both surfaces of the obtained interlayer film for laminated glass. At this time, as the transfer conditions, the temperature of the interlayer film for laminated glass was set to be 80° C., the temperature of the rolls was set to be 145° C., the linear velocity was set to be 10 m/min, and the linear press pressure was set to be 10 kN/m to 200 kN/m. The surface roughness of the shaped interlayer film for laminated glass was measured as the 10-point average roughness (Rz) described in JIS B 0601 (1994). As a result, the surface roughness was confirmed to be 16 μm. The surface roughness was obtained by performing data processing on digital signals measured using a surface roughness tester (SE1700α manufactured by Kosaka Laboratory Ltd.). The surface roughness was measured in a direction perpendicular to the engraved line, under conditions of a cutoff value=2.5 mm, a reference length=2.5 mm, an evaluation length=12.5 mm, a radius of the tip of a probe=2 μm, a tip angle=60°, and a measurement rate=0.5 mm/s.

As a second step, recesses and protrusions each having a groove shape with a continuous bottom (a shape of an engraved line) were formed on a surface of the interlayer film for laminated glass according to the following procedure. As a device for transferring the shape of recesses and protrusions, a pair of rolls composed of a metal roll of which the surface had undergone milling processing by using a triangular inclined mill and a rubber roll having a JIS hardness of 45 to 75 was used. The interlayer film for laminated glass, to which the shape of random recesses and protrusions had been transferred in the first step, was passed through the device for transferring the shape of recesses and protrusions. As a result, on a surface of the layer A of the interlayer film for laminated glass, recesses and protrusions were formed, in which the recesses each having a groove shape with a continuous bottom (a shape of an engraved line) were parallel to each other and arranged in a line at an equal interval. At this time, as the transfer conditions, the temperature of the interlayer film for laminated glass was set to be room temperature, the roll temperature was set to be 130° C., the linear velocity was set to 10 m/min, the film width was set to be 1.5 m, and the press pressure was set to be 500 kPa.

Subsequently, a surface of the layer C of the interlayer film for laminated glass was subjected to the same operation as described above, except that a metal roll having a different shape of recesses and protrusions was used, and in this way, recesses each having a groove shape with a continuous bottom (a shape of an engraved line) were formed on the surface. At this time, the recesses were formed such that a crossing angle between the recesses each having a groove shape with a continuous bottom (a shape of an engraved line) that were formed on the surface of the layer A and the recesses each having a groove shape with a continuous bottom (a shape of an engraved line) that were formed on the surface of the layer C became 10°.

(5) Measurement of Recesses and Protrusions of Surface of Layer A and Layer C

By using an optical microscope (BS-8000III manufactured by SONIC-GROUP), the surface (an observation range of 20 mm×20 mm) of the layer A and the layer C of the obtained interlayer film for laminated glass was observed. Furthermore, an interval between the recesses adjacent to each other was measured, and then the average of the shortest distances between the very bottom portions of the recesses adjacent to each other was calculated, thereby obtaining an interval between the recesses. An interval between the recesses on the surface of the layer A was 500 μm, and an interval between the recesses on the surface of the layer C was 750 μm. Herein, the average and the maximum value of the shortest distance were the same for the layer A and the layer C.

In order to obtain the groove depth (Rzg) of the recesses on the surface of the layer A and the layer C of the obtained interlayer film for laminated glass, a groove depth based on a mean line of a roughness curve (a line set such that the sum of squares of deviation from the roughness curve is minimized) was calculated by setting a reference length specified in JIS B-0601 (1994) "Surface roughness-definition and expression" to be 2.5 mm; an average of the depths of the grooves measured was taken as a groove depth per reference length; and an average of the groove depth per reference length of 5 grooves was taken as the groove depth (Rzg). The number of grooves of the layer A was 5, and the number of grooves of the layer C was 4. Furthermore, the groove depth (Rzg) of the recesses of the surface of the layer A and the layer C was obtained by performing data processing on digital signals measured using a surface roughness tester (SE1700α manufactured by Kosaka Laboratory Ltd.). The surface roughness was measured in a direction perpendicular to the engraved line, under the conditions of a radius of the tip of a probe=2 μm, a tip angle=60°, and a measurement rate=0.5 mm/s.

The groove depth (Rzg) of the recesses of the surface of the layer A was 21 μm, and the groove depth (Rzg) of the recesses of the surface of the layer C was 19 μm.

In addition, the surface of the layer A and the layer C of the obtained interlayer film for laminated glass was measured using a surface roughness tester (SE1700α manufactured by Kosaka Laboratory Ltd.), thereby obtaining the 10-point average roughness (Rz) thereof. The 10-point average roughness (Rz) of the surface of the layer A was 51 μm, and the 10-point average roughness (Rz) of the surface of the layer C was 50 μm.

(6) Measurement of Recesses and Protrusions of Interface

The obtained interlayer film for laminated glass was cut to 5 cm (length)×5 cm (width) and allowed to stand for 2 hours in an environment with a temperature of 25° C. and a humidity of 30%.

By inserting a finger between the layer A and the layer B, the layers were peeled off from each other at a rate of 10 cm/s to 15 cm/s. After the peeling off, they were allowed to stand for 2 hours in an environment with a temperature of 25° C. and a humidity of 30%. Subsequently, the surface of the peeled off layer A on the side of the layer B was measured using a high-precision profilometry system (manufactured by KEYENCE CORPORATION, "KS-1100" equipped with a tip head of "LT-9510VM" model) based on JIS B 0601 (1994), thereby obtaining the 10-point average roughness (Rz). The 10-point average roughness (Rz) of the surface of the peeled off layer A on the side of the layer B was 1.7 μm. Regarding the measurement conditions, a stage moving rate was set to be 100.0 μm/s, a measurement pitch of an X-axis was set to be 2.0 μm, and a measurement pitch of a Y-axis was set to be 2.0 μm.

The layer B and the layer C were also peeled off from each other in the same method as described above, and the 10-point average roughness (Rz) of the surface of the peeled off layer C on the side of the layer B was obtained. The 10-point average roughness (Rz) of the surface of the peeled off layer C on the side of the layer B was 1.9 μm.

Examples 2 to 5, Comparative Example 1

Interlayer films for laminated glass were prepared by the same method as in Example 1, except that the thickness of each layer, the interval between the recesses on the surface of the layer A and the layer C, the groove depth (Rzg) of the recesses, the 10-point average roughness (Rz), the 10-point average roughness (Rz) of the surface of the peeled off layer A on the side of the layer B, and the 10-point average roughness (Rz) of the surface of the peeled off layer C on the side of the layer B were set as shown in Table 1.

In Example 2, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 200 kPa.

In Example 3, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 400 kPa.

In Example 4, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 500 kPa.

In Example 5, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 500 kPa.

In Comparative example 1, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 200 kPa.

Herein, in the step of measuring the interval between the recesses in Examples 2 to 5 and Comparative example 1, the average and the maximum value of the shortest distance between the recesses were the same for all of the examples.

Examples 6 and 7, Comparative Example 2

Interlayer films for laminated glass were prepared by the same method as in Example 1, except that the thickness of each layer, the interval between the recesses of the surface of the layer A and the layer C, the groove depth (Rzg) of the recesses, the 10-point average roughness (Rz), the 10-point average roughness (Rz) of the surface of the peeled off layer A on the side of the layer B, and the 10-point average roughness (Rz) of the surface of the peeled off layer C on the side of the layer B were set as shown in Table 1, and the transfer conditions at the time of forming the recesses and protrusions were changed.

In Example 6, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 700 kPa.

In Example 7, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 200 kPa.

In Comparative example 2, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 100 kPa.

Herein, in the step of measuring the interval between the recesses in Examples 6 and 7 and Comparative example 2, the average and the maximum value of the shortest distance between the recesses were the same for all of the examples.

Comparative Examples 3 and 4

As a device for transferring orange peel-like embossments, a pair of rolls was used which had undergone blasting processing in which a blasting material formed of aluminum oxide (#36: having a roughness of 65 μm under a saturation condition) had been discharged to the rolls at a discharge pressure of 50×10$^4$ Pa. The interlayer film for laminated glass obtained in Example 1 was passed through the device for transferring orange peel-like embossments, and as a result, orange peel-like embossments were formed on the surface of the layer A and the layer C of the interlayer film for laminated glass.

At this time, as the transfer conditions, the temperature of the interlayer film for laminated glass was set to be room temperature, the roll temperature was set to be 130° C., the linear velocity was set to be 10 m/min, the film width was set to be 1.5 m, and the press pressure was set to be 500 kPa.

Herein, in the interlayer film for laminated glass obtained in Comparative examples 3 and 4, the groove depth (Rzg) could not be measured.

Examples 8 to 10

Interlayer films for laminated glass were prepared by the same method as in Example 1, except that the thickness of each layer, the interval between the recesses of the surface of the layer A and the layer C, the groove depth (Rzg) of the recesses, the 10-point average roughness (Rz), the 10-point average roughness (Rz) of the surface of the peeled off layer A on the side of the layer B, and the 10-point average roughness (Rz) of the surface of the peeled off layer C on the side of the layer B were set as shown in Table 1.

In Example 8, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 200 kPa.

In Example 9, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 500 kPa.

In Example 10, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the press pressure was set to be 500 kPa.

Herein, in the step of measuring the interval between the recesses in Examples 8 to 10, the average and the maximum value of the shortest distance between the recesses were the same for all of the examples.

Examples 11 to 14

Interlayer films for laminated glass were prepared by the same method as in Example 1, except that the amount of acetyl groups, the amount of butyral groups, and the amount of hydroxyl groups of the polyvinyl butyral used in the protective layer and the sound insulating layer as well as the content of the plasticizer were changed as shown in Table 1; the thickness of each layer, the interval between the recesses of the surface of the layer A and the layer B, the groove depth (Rzg) of the recesses, the 10-point average roughness (Rz), the 10-point average roughness (Rz) of the surface of the peeled off layer A on the side of the layer B, and the 10-point average roughness (Rz) of the surface of the peeled off layer C on the side of the layer B were set as shown in Table 1; and the transfer conditions at the time of forming the recesses and protrusions were changed. Herein, the polyvinyl butyral used in the protective layer and the sound insulating layer was obtained by acetalizing polyvinyl alcohol having an average degree of polymerization of 1,700 by using n-butyl aldehyde.

In Example 11, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the linear press pressure was set to be 200 kPa.

In Example 12, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the linear press pressure was set to be 500 kPa.

In Example 13, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the linear press pressure was set to be 500 kPa.

In Example 14, as the transfer conditions at the time of forming the recesses and protrusions, the temperature of the interlayer film for laminated glass was set to be room temperature, the roll temperature was set to be 130° C., the linear velocity was set to be 10 m/min, the film width was set to be 1.5 m, and the linear press pressure was set to be 550 kPa.

Herein, in the step of measuring the interval between the recesses in Examples 11 to 14, the average and the maximum value of the shortest distance between the recesses were the same for all of the examples.

(Evaluation)

The interlayer films for laminated glass obtained in examples and comparative examples were evaluated by the following method.

The results are shown in Table 1. In the table, "Degree of butylation" represents the amount of butyral groups, "Degree of hydroxylation" represents the amount of hydroxyl groups, "Degree of acetylation" represents the amount of acetyl groups, and "Plasticizer (parts)" represents the content of the plasticizer with respect to 100 parts by mass of polyvinyl butyral.

(1) Evaluation of Deaerating Properties

The obtained interlayer film for laminated glass having the recesses and protrusions on a surface thereof was preliminarily pressure-bonded and then full pressure-bonded by means of a vacuum deaeration method, thereby preparing laminated glass.

(Vacuum Deaeration Method)

The interlayer film was interposed between 2 sheets of clear glass plates (30 cm (length)×30 cm (width)×2.5 mm (thickness)), and the portion sticking out of the glass plates was cut off. Laminated glass structure (laminate) obtained in this way was moved into a rubber bag, and the rubber bag was connected to a suction decompressor. The laminated glass structure was heated and held under a pressure reduced to −60 kPa (an absolute pressure of 16 kPa) for 10 minutes. The laminated glass structure (laminate) was kept heated until the temperature (preliminary pressure-bonding temperature) thereof became 70° C., and then the pressure was returned to the atmospheric pressure to finish the preliminary pressure-bonding. Herein, at the time of the preliminary pressure-bonding, deaeration was started at a temperature of 40° C., 50° C., and 60° C.

(Full Pressure-Bonding)

The laminated glass structure (laminate) having been full pressure-bonded by the aforementioned method was put into an autoclave and held under conditions of a temperature of 140° C. and a pressure of 1,300 kPa for 10 minutes. The laminated glass was then cooled to 50° C., and the pressure was returned to the atmospheric pressure to finish full pressure-bonding. In this way, laminated glass was prepared.

(Baking Test of Laminated Glass)

The obtained laminated glass was heated for 2 hours in an oven at 140° C. Thereafter, the laminated glass was taken out of the oven and left to cool for 3 hours, and then the external appearance of the laminated glass was visually observed. For 20 sheets of the laminated glass, the number of the laminated glass in which bubbles (air bubbles) occurred between the glass plate and the interlayer film for laminated glass was counted. A case where the number of the laminated glass in which bubbles occurred under all of the conditions was equal to or less than 5 was evaluated to be "O", and a case where the number of the laminated glass in which bubbles occurred was equal to or greater than 6 was evaluated to be "X".

(2) Evaluation of Optical Strain

A fluorescent lamp (FL32S.D manufactured by Panasonic Corporation) was placed at a point 7 m away from an observer, and the obtained laminated glass was placed at a point 40 cm away from the observer on a straight line connecting the fluorescent lamp to the observer, such that the laminated glass slanted by 20° with respect to a horizontal plane. A case where the fluorescent lamp was seen to be distorted through the laminated glass was evaluated to be "X", and a case where the fluorescent lamp was seen without distortion through the laminated glass was evaluated to be "O".

(3) Evaluation of Occurrence of Ghost Image

By using two types of light sources 1 and 2 having different brightness, whether or not a ghost image occurred was evaluated. The light source 1 was a 10 W silica light bulb (manufactured by Kyokko Ins., PS55 E 26 110 V-10 W, a total luminous flux of 70 lm) which was assumed to be a source of light having general brightness that may enter window glasses of automobiles, airplanes, buildings, and the like. The light source 2 was a 40 W silica light bulb (manufactured by ASAHI ELECTRIC CO., LTD., LW 100 V 38 W-W, a total luminous flux of 440 lm) which was assumed to be a source of light having particularly high brightness among lights that can enter window glasses of automobiles, airplanes, buildings, and the like. Through the method based on JIS R 3212 (2008), whether or not a ghost image occurred in the obtained laminated glass was evaluated. As a result, a case where only a single image was observed when any of the light source 1 and the light source 2 was used or a case where a double image 15 minutes of arc was evaluated to be "OO". Furthermore, a case where a ghost image occurred when the light source 2 was used, but a single image was observed when the light source 1 was used or a case where a double image 15 minutes of arc was evaluated to be "O". In addition, a case where a triple image occurred when any of the light source 1 and the light source 2 was used was evaluated to be "X".

Herein, the laminated glass was measured by assuming that the angle thereof actually mounted on a car is 30°. Furthermore, the layer A was disposed such that an angle formed between the recess having the shape of an engraved line formed on the surface of the layer A and a horizontal direction became 5°, and the layer B was disposed such that an angle formed between the recess having the shape of an engraved line formed on the surface of the layer C and a horizontal direction became −5°.

Moreover, the double image 15 minutes of arc was not an image resulting from the interlayer film but an image resulting from glass.

TABLE 1

| | | | Example 1 | Example 2 | Example 3 | Example 4 | Example 5 |
|---|---|---|---|---|---|---|---|
| Compounding | Deposition of protective layer | Degree of butylation (mol %) | 69 | 69 | 69 | 69 | 69 |
| | | Degree of hydroxylation (mol %) | 30 | 30 | 30 | 30 | 30 |
| | | Degree of acetylation (mol %) | 1 | 1 | 1 | 1 | 1 |
| | | Plasticizer (parts) (phr) | 40 | 40 | 40 | 40 | 40 |

TABLE 1-continued

| | | | | | | | |
|---|---|---|---|---|---|---|---|
| | Composition of sound insulating layer | Degree of butylation (mol %) | 66 | 66 | 66 | 66 | 66 |
| | | Degree of hydroxylation (mol %) | 22 | 22 | 22 | 22 | 22 |
| | | Degree of acetylation (mol %) | 12 | 12 | 12 | 12 | 12 |
| | | Plasticizer (parts) (phr) | 60 | 60 | 60 | 60 | 60 |
| Thickness | Layer A (μm) | | 450 | 450 | 300 | 300 | 300 |
| | Layer B (μm) | | 100 | 100 | 100 | 100 | 100 |
| | Layer C (μm) | | 450 | 450 | 300 | 300 | 300 |
| Concavities and convexities on surface of layer A | Groove Depth (Reg) of concaviting (μm) | | 21 | 20 | 22 | 23 | 22 |
| | Arrangement interval between concaviting (μm) | | 500 | 500 | 400 | 300 | 180 |
| | 10-point average roughness (Rz) (μm) | | 51 | 50 | 50 | 53 | 52 |
| Concavities and convexities on surface of Desired off layer A on side of layer B | 10-point average roughness (Rz) (μm) | | 1.7 | 1.6 | 2.3 | 1.8 | 1.5 |
| Concavities and convexities on surface of layer C | Groove Depth (Reg) of concaviting (μm) | | 19 | 19 | 21 | 22 | 24 |
| | Arrangement interval between concaviting (μm) | | 750 | 500 | 400 | 300 | 220 |
| | 10-point average roughness (Rz) (μm) | | 50 | 48 | 48 | 53 | 55 |
| Concavities and convexities on surface of Desired off layer C on side of layer B | 10-point average roughness (Rz) (μm) | | 1.9 | 1.7 | 2.0 | 1.7 | 1.6 |

| | | | Example 1 | | | Example 2 | | | Example 3 | | | Example 4 | | | Example 5 | | |
|---|---|---|---|---|---|---|---|---|---|---|---|---|---|---|---|---|---|
| Evaluation of desorating properties | Temperature at which degradation starts/° C. | | 40 | 50 | 60 | 40 | 50 | 60 | 40 | 50 | 60 | 40 | 50 | 60 | 40 | 50 | 60 |
| | Temperature at which preliminary compression ends/° C. | | 70 | 70 | 70 | 70 | 70 | 70 | 70 | 70 | 70 | 70 | 70 | 70 | 70 | 70 | 70 |
| | Baking test (number of sheath in which bubbles occurred/20 sheets) | | 0 | 1 | 1 | 0 | 0 | 1 | 0 | 0 | 0 | 0 | 0 | 0 | 0 | 0 | 0 |
| Evaluation of optical strain | | | ○ | | | ○ | | | ○ | | | ○ | | | ○ | | |
| Evaluation of occurrence of ghost image | | | ○ | | | ○○ | | | ○ | | | ○○ | | | ○○ | | |

| | | | Example 6 | Example 7 | Example 8 | Example 9 | Example 10 |
|---|---|---|---|---|---|---|---|
| Compounding | Deposition of protective layer | Degree of butylation (mol %) | 69 | 69 | 69 | 69 | 69 |
| | | Degree of hydroxylation (mol %) | 30 | 30 | 30 | 30 | 30 |
| | | Degree of acetylation (mol %) | 1 | 1 | 1 | 1 | 1 |
| | | Plasticizer (parts) (phr) | 40 | 40 | 40 | 40 | 40 |
| | Composition of sound insulating layer | Degree of butylation (mol %) | 66 | 66 | 66 | 66 | 66 |
| | | Degree of hydroxylation (mol %) | 22 | 22 | 22 | 22 | 22 |
| | | Degree of acetylation (mol %) | 12 | 12 | 12 | 12 | 12 |
| | | Plasticizer (parts) (phr) | 60 | 60 | 60 | 60 | 60 |
| Thickness | Layer A (μm) | | 300 | 300 | 300 | 350 | 300 |
| | Layer B (μm) | | 100 | 100 | 100 | 100 | 100 |
| | Layer C (μm) | | 300 | 300 | 300 | 350 | 300 |

TABLE 1-continued

| | | | | | | |
|---|---|---|---|---|---|---|
| Concavities and convexities on surface of layer A | Groove Depth (Reg) of concaviting (μm) | 31 | 15 | 17 | 22 | 14 |
| | Arrangement interval between concaviting (μm) | 180 | 180 | 300 | 300 | 150 |
| | 10-point average roughness (Rz) (μm) | 60 | 43 | 34 | 53 | 30 |
| Concavities and convexities on surface of Desired off layer A on side of layer B | 10-point average roughness (Rz) (μm) | 1.9 | 1.2 | 1.2 | 1.2 | 1.0 |
| Concavities and convexities on surface of layer C | Groove Depth (Reg) of concaviting (μm) | 33 | 11 | 14 | 23 | 14 |
| | Arrangement interval between concaviting (μm) | 220 | 220 | 300 | 300 | 120 |
| | 10-point average roughness (Rz) (μm) | 62 | 40 | 32 | 55 | 30 |
| Concavities and convexities on surface of Desired off layer C on side of layer B | 10-point average roughness (Rz) (μm) | 1.8 | 1.3 | 1.3 | 1.2 | 1.0 |
| Evaluation of desorating properties | Temperature at which degradation starts/° C. | 40  50  60 | 40  50  60 | 40  50  60 | 40  50  60 | 40  50  60 |
| | Temperature at which preliminary compression ends/° C. | 70  70  70 | 70  70  70 | 70  70  70 | 70  70  70 | 70  70  70 |
| | Baking test (number of sheath in which bubbles occurred/20 sheets) | 0   0   0 | 0   0   0 | 0   0   1 | 0   0   0 | 0   1   1 |
| | | ○ | ○ | ○ | ○ | ○ |
| Evaluation of optical strain | | ○ | ○ | ○ | ○ | ○ |
| Evaluation of occurrence of ghost image | | ○ | ○○ | ○○ | ○○ | ○○ |

TABLE 2

| | | | Example 11 | Example 12 | Example 13 | Example 14 |
|---|---|---|---|---|---|---|
| Compounding | Composition of protective layer | Degree of butylation (mol %) | 69 | 68.5 | 69 | 70 |
| | | Degree of hydroxylation (mol %) | 30 | 31 | 30.7 | 29 |
| | | Degree of acetylation (mol %) | 1 | 0.5 | 0.3 | 1 |
| | | Plasticizer (parts) (phr) | 36 | 36 | 37.5 | 39 |
| | Composition of sound insulating layer | Degree of butylation (mol %) | 66 | 67.5 | 71 | 77.7 |
| | | Degree of hydroxylation (mol %) | 24.5 | 24.5 | 23 | 20.8 |
| | | Degree of acetylation (mol %) | 10.5 | 8 | 6 | 1.5 |
| | | Plasticizer (parts) (phr) | 75 | 75 | 76 | 77 |
| Thickness | | Layer A (μm) | 300 | 300 | 300 | 300 |
| | | Layer B (μm) | 100 | 100 | 100 | 100 |
| | | Layer C (μm) | 300 | 300 | 300 | 300 |
| Concavities and convexities on surface of layer A | | Groove depth (Reg) of concavities (μm) | 22 | 23 | 22 | 31 |
| | | Arrangement interval between concavities (μm) | 400 | 300 | 180 | 180 |
| | | 10-point average roughness (Rz) (μm) | 50 | 53 | 52 | 60 |
| Concavities and convexities on surface of period off layer A on side of layer B | | 10-point average roughness (Rz) (μm) | 2.3 | 1.8 | 1.5 | 1.9 |
| Concavities and convexities on surface of layer C | | Groove depth (Reg) of concavities (μm) | 21 | 22 | 24 | 33 |
| | | Arrangement interval between concavities (μm) | 400 | 300 | 220 | 220 |
| | | 10-point average roughness (Rz) (μm) | 48 | 53 | 55 | 62 |
| Concavities and convexities on surface of period off layer C on side of layer D | | 10-point average roughness (Rz) (μm) | 2.0 | 1.7 | 1.6 | 1.8 |
| Evaluation of desorating properties | | Temperature at which desoration starts/° C. | 40  50  60 | 40  50  60 | 40  50  60 | 40  50  60 |
| | | Temperature at which preliminary compression ends/° C. | 70  70  70 | 70  70  70 | 70  70  70 | 70  70  70 |
| | | Baking test (number of sheets in which bubbles occurred/20 sheets) | 0   0   0 | 0   0   0 | 0   0   0 | 0   0   0 |
| | | | ○ | ○ | ○ | ○ |

TABLE 2-continued

| | | | Comparative example 1 | Comparative example 2 | Comparative example 3 | Comparative example 4 |
|---|---|---|---|---|---|---|
| Evaluation of optical strain | | | ◯ | ◯ | ◯ | ◯ |
| Evaluation of occurrance of ghost image | | | ◯ | ◯◯ | ◯◯ | ◯ |
| Compounding | Composition of protective layer | Degree of butylation (mol %) | 69 | 69 | 69 | 69 |
| | | Degree of hydroxylation (mol %) | 30 | 30 | 30 | 30 |
| | | Degree of acetylation (mol %) | 1 | 1 | 1 | 1 |
| | | Plasticizer (parts) (phr) | 40 | 40 | 40 | 40 |
| | Composition of sound insulating layer | Degree of butylation (mol %) | 66 | 66 | 66 | 66 |
| | | Degree of hydroxylation (mol %) | 22 | 22 | 22 | 22 |
| | | Degree of acetylation (mol %) | 12 | 12 | 12 | 12 |
| | | Plasticizer (parts) (phr) | 60 | 60 | 60 | 60 |
| Thickness | | Layer A (μm) | 300 | 300 | 300 | 300 |
| | | Layer B (μm) | 100 | 100 | 100 | 100 |
| | | Layer C (μm) | 300 | 300 | 300 | 300 |
| Concavities and convexities on surface of layer A | | Groove depth (Reg) of concavities (μm) | 22 | 9 | — | — |
| | | Arrangement interval between concavities (μm) | 500 | 500 | — | — |
| | | 10-point average roughness (Rz) (μm) | 54 | 35 | 30 | 43 |
| Concavities and convexities on surface of period off layer A on side of layer B | | 10-point average roughness (Rz) (μm) | 2.7 | 1.9 | 1.0 | 2.6 |
| Concavities and convexities on surface of layer C | | Groove depth (Reg) of concavities (μm) | 20 | 8 | — | — |
| | | Arrangement interval between concavities (μm) | 750 | 750 | — | — |
| | | 10-point average roughness (Rz) (μm) | 50 | 36 | 32 | 45 |
| Concavities and convexities on surface of period off layer C on side of layer D | | 10-point average roughness (Rz) (μm) | 2.8 | 1.8 | 1.0 | 2.4 |
| Evaluation of desorating properties | | Temperature at which desoration starts/° C. | 40 50 60 | 40 50 60 | 40 50 60 | 40 50 60 |
| | | Temperature at which preliminary compression ends/° C. | 70 70 70 | 70 70 70 | 70 70 70 | 70 70 70 |
| | | Baking test (number of sheets in which bubbles occurred/20 sheets) | 0 0 0 ◯ | 6 8 9 X | 6 8 9 X | 4 5 7 X |
| | Evaluation of optical strain | | ◯ | ◯ | ◯ | X |
| | Evaluation of occurrance of ghost image | | X | ◯ | ◯ | ◯ |

INDUSTRIAL APPLICABILITY

According to the present invention, it is possible to provide an interlayer film for laminated glass that includes 2 or more resin layers laminated on each other, exhibits excellent deaerating properties in a manufacturing process of laminated glass, and can inhibit the occurrence of ghost images, and to provide laminated glass including the interlayer film for laminated glass.

REFERENCE SIGNS LIST

1 ONE RECESS RANDOMLY SELECTED
2 RECESS ADJACENT TO ONE RECESS RANDOMLY SELECTED
3 RECESS ADJACENT TO ONE RECESS RANDOMLY SELECTED
A INTERVAL BETWEEN RECESS 1 AND RECESS 2
B INTERVAL BETWEEN RECESS 1 AND RECESS 3
10 RESIN LAYER
20 RESIN LAYER HAVING A SURFACE INCLUDING A LARGE NUMBER OF RECESSES AND A LARGE NUMBER OF PROTRUSIONS
21 SURFACE OF RESIN LAYER 20 HAVING A LARGE NUMBER OF RECESSES AND A LARGE NUMBER OF PROTRUSIONS
22 SURFACE OF RESIN LAYER 20 ON THE SIDE THAT CAME INTO CONTACT WITH RESIN LAYER 10
30 RESIN LAYER

The invention claimed is:

1. An interlayer film for laminated glass comprising 2 or more resin layers laminated on each other,
    wherein the resin layers contain polyvinyl acetal and a plasticizer,
    wherein at least one of the resin layers has a plurality of recesses and a plurality of protrusions on an outer surface such that the interlayer film has the plurality of recesses and the plurality of protrusions on at least one outer surface thereof,
    the recesses each have a groove shape with a continuous bottom,
    the recesses adjacent to each other are parallel to each other and regularly arranged in a line,
    within the at least one outer surface of the interlayer film having the plurality of recesses and the plurality of protrusions, a groove depth (Rzg) of the recesses measured based on JIS B-0601(1994) is 10 μm to 40 μm, and
    a 10-point average roughness (Rz) of an inner surface of the resin layer having the plurality of recesses and the plurality of protrusions measured based on JIS B 0601 (1994) is less than 2.7 μm,
    wherein the 10-point average roughness (Rz) is obtained by:
        peeling off the resin layer having the plurality of recesses and the plurality of protrusions from another resin layer in direct contact with the resin layer having the plurality of recesses and the plurality of protrusions to expose the inner surface of the resin layer having the plurality of recesses and the plurality of protrusions, wherein the inner surface of the resin layer having the plurality of recesses and the plurality of protrusions is the surface that was in direct contact with the another resin layer prior to the peeling off, and then measuring the inner surface of the resin layer having the plurality of recesses and the plurality of protrusions based on JIS B 0601(1994).

2. The interlayer film for laminated glass according to claim 1,
wherein the recesses adjacent to each other are parallel to each other and arranged in a line at an equal interval.

3. The interlayer film for laminated glass according to claim 1, comprising at least:
a first resin layer; and
a second resin layer,
wherein the amount of hydroxyl groups of the polyvinyl acetal contained in the first resin layer is different from the amount of hydroxyl groups of the polyvinyl acetal contained in the second resin layer.

4. The interlayer film for laminated glass according to claim 1,
wherein the content of the plasticizer in the first resin layer with respect to 100 parts by mass of the polyvinyl acetal is different from the content of the plasticizer in the second resin layer with respect to 100 parts of the polyvinyl acetal.

5. A laminated glass comprising:
a pair of glass plates; and
the interlayer film for laminated glass according to claim 1 that is laminated between the glass plates.

6. The interlayer film for laminated glass according to claim 1,
wherein the plurality of recesses consists of recesses that are parallel to each other and regularly arranged in a line.

* * * * *